Patented Mar. 17, 1931

1,797,211

UNITED STATES PATENT OFFICE

ALEX BROOKING DAVIS, OF CINCINNATI, OHIO, ASSIGNOR, BY MESNE ASSIGNMENTS, TO KEYSTONE WATCH CASE CORPORATION, OF RIVERSIDE, NEW JERSEY, A CORPORATION OF PENNSYLVANIA

PROCESS OF AND PRODUCT FOR PHOTOGRAPHIC ETCHING

No Drawing. Original application filed December 16, 1926, Serial No. 155,337. Divided and this application filed November 9, 1928. Serial No. 318,312.

This invention relates to novel improvements in the art of photography, and it has particularly to do with a photographic film which has special advantages when used in the process of etching. The invention also pertains to a novel process of preparing the film and to the process of using and treating the film when employed, for instance, in etching and similar work.

This application is a division of my prior application, Serial No. 155,337, filed December 16, 1926, for improvements in process of and product for photographic etching.

In a copending application entitled Process of and product for photographic etching, filed December 16, 1926, Serial Number 155,336, directed to improvements in the detail of that process described by E. Valenta of Vienna, Austria, in Photographische Korrespondenz, 1910 at pages 238–40, where Valenta makes a light sensitive resist for photo etching by reacting upon asphalt with sulfur chloride, Valenta adding the sulfur chloride solution very slowly, while my improvements call for the immediate addition of the entire quantity necessary for the reaction, which is approximately eight per cent of the weight of the asphalt. Also, in my copending application, I have further improved the quality of the resist by washing it in film form with ether after its application to the surface to be etched. I have now found that this step may be advantageously carried out on the basic substance, thereby shortening the detail of operation by removing the ether soluble portion from the resist en masse.

This process may be carried out in detail as follows: To 25 grams of any ordinary asphalt, dissolved in 150 cc. carbon bisulphide, 2 grams of sulfur chloride dissolved in 8 cc. carbon bisulphide is added all at once, and the reaction allowed to proceed at the boiling point of the solvent until it has gone to practical completion. The balance of the carbon bisulphide which can be removed at water bath temperature is then driven off and there is then added 500 cc. of ethyl ether and the mass thoroughly shaken. There dissolves in the ether the more soluble portion of the asphaltic material, and this solvent action of the ether is selective so far as light sensitivity is concerned, the material which goes into solution being the least light sensitive. The ether is now decanted from the black, semi-solid residue and the final portion of ether driven off on the water bath. The residue is then dissolved in 150 cc. of benzol and this solution filtered from a small portion of insoluble matter. This benzol solution now constitutes the resist, which is ready for application to the surface to be etched. Designs borne by a glass screen, or otherwise, are interposed between an arc fitted with a suitable condenser and the surface bearing the resist, and the designs are projected on the resist, the portions of the resist not rendered insoluble by the action of light are removed by a solvent including turpentine, and the etching may be accomplished by known processes.

From experiments, I have found that Valenta's process is somewhat difficult to use practically on account of un-uniform results, the details which I have added so far perfect the Valenta process that entirely uniform results are obtained using practically any kind of soft commercial asphalt, such as Trinidad or Mexican asphalt. What I believe to be novel improvements on Valenta's process are the steps in the process detail of adding the carbon bisulphide solution of sulfur chloride to the asphalt all at once, since under these conditions the reaction seems to take an entirely different and more highly desirable course than when added as directed by Valenta, and also the step of removing the ether soluble portions of the resulting reaction product of the mass as described instead of from the film after deposition as in my copending application.

I have further found that this process detail is applicable to other organic substances than asphalt, for if the process be carried out exactly as described, but using pine resin in place of asphalt, a resist suitable for photo etching is obtained, and I do not therefore restrict the application of this process detail to asphalt alone, nor to the use of ether as the solvent, as other solvents of an ethereal character, such as methyl ethyl ether, will serve the purpose; and in fact any solvent capable of removing the undesirable portion of the reaction mass I regard as falling within the scope of this invention.

Ordinary asphalt yields colloidal solutions, as do also its reaction products with sulfur chloride, and the sulfur chloride apparently both chlorinates and sulfurizes the various asphaltic ingredients, products which are not only light sensitive, but others which act as catalysts or accelerators for the light sensitive portion. The ultimate film, therefore, consists of a hydrophobic colloid including sensitizers or catalysts. The sensitivity is still further increased, as directed by Valenta, by the addition of 2% of oil of lavender, this oil being high in aldehydes which apparently act in a catalytic manner as well as by direct condensation for increasing the light sensitivity of the film.

It is evident from the above that my resist consists of hydrophobic colloids including catalysts and sensitizers therefor, and the process detail as above described has so far increased the value of asphalt as a photographic resist that it is thoroughly practical for use in plant operations, being stable for at least six weeks without deterioration and capable of being rendered insoluble by light exposure with ordinary arc projection machines in less than one minute, and I have obtained good pictures in 15 seconds which have withstood the action of an electrolyte etching bath for 30 minutes. These results are a great improvement over the results obtained by other researchers.

It is to be understood that the foregoing description of the improved resist and the process of use thereof may be varied to some extent, but such variations and changes as may be desired are considered as being within the scope of the invention as would be permitted by the broad interpretation of the following claims.

What I claim is:

1. In the process of etching, the steps comprising forming a light sensitive hydrophobic colloid by reacting a carbon bisulphide solution of an asphalt base material with a carbon bisulphide solution of sulphur chloride en masse, and removing the non-reacted light-insensitive portions, placing a film of the light-sensitive residue on an object to be etched, projecting a design onto said film, developing, and etching.

2. In the process of etching, the steps of placing on an object to be etched a film of a light-sensitive hydrophobic colloid, projecting a design on said film, developing, and etching, said hydrophobic colloid being the light-sensitive reaction product of the bulk treatment of a carbon bisulphide solution of asphalt-like materials with a carbon bisulphide solution of sulphur chloride which product has been treated with ether to remove light-insensitive reaction products.

3. In the process of etching, the steps of placing on an object to be etched a film of sensitized asphalt, projecting a design on said film, developing and etching, said sensitized asphalt being the residuum of the bulk reaction product of carbon bisulphide solutions of asphalt and sulphur chloride which has been treated with ether to remove unreacted light-insensitive portions.

4. A photographic print comprising the photo-reaction products of a sensitized light-sensitive hydrophobic colloid resulting from the bulk treatment of a carbon bisulphide solution of a colloid base material with a carbon bisulphide solution of sulphur chloride en masse, which colloid has been treated with ether to remove unreacted light-insensitive portions.

5. A photographic print comprising the photo-reaction products of the sensitized light-sensitive reaction products of the treatment, en masse, of asphalt with sulphur chloride, the asphalt and the sulphur chloride being severally dissolved in carbon bisulphide, and the reaction products washed with ether to remove unreacted light-insensitive portions.

ALEX BROOKING DAVIS.